United States Patent Office 3,014,014
Patented Dec. 19, 1961

3,014,014
PROCESS FOR POLYMERIZING VINYL ETHERS
Robert Chiang, Wilmington, Del., assignor to Hercules Powder Company, Wilmington, Del., a corporation of Delaware
No Drawing. Filed Sept. 30, 1959, Ser. No. 843,366
4 Claims. (Cl. 260—91.1)

This invention relates to a new process for the production of poly(vinyl ethers) of high molecular weight and high crystallinity.

It is well known that vinyl ethers may be polymerized in bulk or solution with Friedel-Crafts catalysts to yield polymers that vary from viscous liquid to balsam-like or soft resinous-like polymers. Under certain conditions and using boron trifluoride-etherates as catalysts it has been possible to produce a crystalline type of poly(vinyl methyl ether) and poly(vinyl isobutyl ether). While a rubbery poly(vinyl ethyl ether) has been produced, it was not crystalline. In the case of both the balsam-like and crystalline-type poly(vinyl methyl ether) of the prior art, the polymer is completely soluble in cold water and in organic solvents such as methanol, ethanol, acetone, and benzene. Because of the extreme solubility of these prior art vinyl ether polymers, their utility has been considerably limited.

Now in accordance with this invention it has been found that vinyl alkyl ethers may be polymerized to high molecular weight, crystalline polymers by using as the catalyst for the polymerization aluminum selenate in combination with an aluminum alkyl and/or alkoxide. The polyethers so produced are high molecular weight, highly crystalline polymers that are capable of being formed into strong, orientable fibers and films.

Any aluminum alkoxide, aluminum trialkyl or alkyl-aluminum alkoxide may be used in combination with the aluminum selenate in accordance with this invention as, for example, aluminum methoxide, ethoxide, propoxide, isopropoxide, butoxide, tert-butoxide, triethylaluminum, triisopropylaluminum, triisobutylaluminum, ethylaluminum diisopropoxide, diethylaluminum isopropoxide, etc. Thus, the aluminum compound used in combination with the aluminum selenate has the general formula

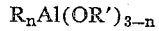

$$R_nAl(OR')_{3-n}$$

where $n$ is 0 to 3, R and R' are alkyl and may be alike or different. Just how the alkoxide acts in combination with the aluminum selenate is not known, but it appears to act as an activator for the aluminum selenate. Because of the adverse effects of water on the polymerization reaction, the aluminum selenate is preferably dried before use to eliminate any water of hydration that may be present.

The aluminum selenate and the aluminum alkoxide may be premixed or mixed in situ. The polymerization of the vinyl alkyl ethers may be carried out with or without a diluent, but for ease of operation and ready separation of the catalyst from the polymer, the process is generally carried out in an inert diluent. Any anhydrous, liquid, organic diluent that is inert under the reaction conditions may be used as, for example, aliphatic, cycloaliphatic or aromatic hydrocarbons, chlorinated hydrocarbons, ethers, esters, etc. The diluent may be a solvent or nonsolvent for the polymerization process, i.e. for the polymer that is produced in the process. Exemplary of the diluents that may be used for the polymerization process in accordance with this invention are hexane, heptane, cyclohexane, benzene, toluene, xylene, etc., or a mixture of such hydrocarbons, methylene chloride, chloroform, carbon tetrachloride, ethylene dichloride, chlorobenzene, diethyl ether, diisopropyl ether, ethyl acetate, etc.

The amount of the aluminum selenate and the aluminum alkoxide catalyst combination used for the polymerization of the vinyl ethers may vary from a minor catalytic amount to a large excess, but generally will be an amount such that the amount of aluminum selenate used in the catalyst mixture will be within the range of from about 0.1% to about 10% of the weight of the vinyl ether being polymerized, and more preferably will be from about 0.05% to about 2.0%. The ratio of the aluminum selenate to the aluminum alkoxide may be varied over a wide range, but preferably will be from about 1:0.1 to 1:5, respectively.

Any vinyl alkyl ether may be polymerized with the above-described catalyst combination in accordance with this invention as, for example, vinyl methyl ether, vinyl ethyl ether, vinyl propyl ether, vinyl isopropyl ether, vinyl n-butyl ether, vinyl isobutyl ether, vinyl tert-butyl ether, vinyl neopentyl ether, vinyl 2-chloroethyl ether, vinyl 2-methoxyethyl ether, and vinyl trifluoroethyl ether, etc., or any mixture of these vinyl alkyl ethers.

The selection of the temperature and pressure used for the polymerization process will depend upon the activity of the specific catalyst being used, the diluent used, etc. In general the polymerization will be carried out at a temperature within the range of from about $-100°$ C. to about $200°$ C., and preferably from about $-50°$ C. to about $100°$ C. and more preferably from about $-20°$ C. to about $50°$ C. In the same way, while atmospheric pressure or a pressure of only a few pounds may be used, the polymerization may be carried out under a wide range of pressures as, for example, from a partial vacuum to about 1000 pounds, and preferably from about atmospheric to about 500 pounds pressure. Higher pressures may, of course, be used, but generally do not appreciably alter the course of the polymerization.

When the polymerization is carried out as described above, the polymer is readily isolated from the solution or slurry of polymer and diluent by simply removing the diluent by evaporation or other such means. Frequently it is desirable to add a stabilizer as the diluent is removed at an elevated temperature. The polymer may then be purified to remove the catalyst residues by washing with an alcoholic or aqueous solution of acid or base or by dissolving the polymer in a suitable solvent, filtering to remove the insoluble catalyst and then separating the polymer from the so-purified solution.

In many cases some amorphous polymer is prepared along with the crystalline polymer. In order to obtain the highest solvent resistance and tensile strength it is generally advisable to remove the amorphous polymer. This is readily done by washing the polymer with a solvent which dissolves the amorphous polymer, but which does not dissolve the crystalline polymer.

The following examples will illustrate the process of polymerizing vinyl ethers in accordance with this invention to high molecular weight, highly crystalline polymers. The molecular weight of the polymers produced in these examples is indicated by the Reduced Specific Viscosity (RSV) given for each. By the term "Reduced Specific Viscosity" is meant the $\eta_{sp/c}$ determined on an 0.1% solution (0.1 g. of the polymer per 100 ml. of solution) of the polymer in chloroform at $25°$ C. All parts and percentages are by weight unless otherwise indicated.

*Example 1*

The aluminum selenate used as the catalyst in this and the following example was prepared by drying aluminum selenate under vacuum at $150°$ C. for 16 hours and then tumbling a mixture of 3 parts of this anhydrous salt with about 18 parts of anhydrous n-heptane until a fine slurry was obtained.

A polymerization vessel with a nitrogen atmosphere was charged with 65 parts of anhydrous methylene chloride, 7.5 parts of vinyl methyl ether and 0.204 part of aluminum isopropoxide. The reaction mixture was cooled to 0° C., and with agitation an amount of the above catalyst slurry equal to 0.17 part of aluminum selenate was then added. The reaction mixture was agitated at this temperature for 6 hours and then at 25° C. for 16 hours. The catalyst was inactivated by adding 4 parts of a 1 M solution of ammonia in ethanol, after which the diluents were removed by evaporation under vacuum. The crude poly(vinyl methyl ether) so obtained was extracted twice with methanol at room temperature. It was found that 50% of this polymer was soluble in cold methanol and the other half was insoluble in cold methanol. The methanol-insoluble poly(vinyl methyl ether) had an RSV of 4.5 (0.1% concentration in chloroform at 25° C.) and a degree of crystallinity of 45% as measured by infrared.

*Example 2*

Example 1 was repeated except that there was used as the diluent 35 parts of n-heptane in place of the 65 parts of methylene chloride used in that example. The methanol-insoluble poly(vinyl methyl ether) so obtained was crystalline as shown by X-ray.

What I claim and desire to protect by Letters Patent is:

1. The process of polymerizing a vinyl alkyl ether in which the alkyl group contains from 1 to 5 carbon atoms which comprises contacting at a temperature from about −100° to about 200° C. at least one of said ethers with the catalyst formed by mixing aluminum selenate with an aluminum compound having the formula $R_nAl(OR')_{3-n}$ where $n$ is 0 to 3 and R and R' are alkyl radicals having from 1 to 4 carbon atoms, the weight ratio of aluminum selenate to said aluminum compound being from about 1:0.1 to 1:5.

2. The process of polymerizing a vinyl alkyl ether in which the alkyl group contains from 1 to 5 carbon atoms which comprises contacting at a temperature from about −100° to about 200° C. at least one of said ethers with the catalyst formed by mixing aluminum selenate with an aluminum alkoxide in which each alkoxide group contains from 1 to 4 carbon atoms, the ratio of aluminum selenate to aluminum alkoxide being from about 1:0.1 to 1:5.

3. The process of claim 2 wherein the vinyl alkyl ether is vinyl methyl ether.

4. The process of claim 3 wherein the aluminum alkoxide is aluminum isopropoxide.

References Cited in the file of this patent
UNITED STATES PATENTS
2,846,427    Findlay ---------------- Aug. 5, 1958